(12) United States Patent
Boyd

(10) Patent No.: US 6,321,482 B1
(45) Date of Patent: Nov. 27, 2001

(54) APPARATUS FOR CONVENIENT CONVEYANCE OF FISHING RODS ON A VEHICLE

(76) Inventor: James E Boyd, P.O. Box 571, 57182 Peerless La., Hatteras, NC (US) 27943

( * ) Notice: Subject to any disclaimer, the term of this patent is extended or adjusted under 35 U.S.C. 154(b) by 0 days.

(21) Appl. No.: 09/405,189

(22) Filed: Sep. 24, 1999

(51) Int. Cl.[7] .................................................. A01K 97/10
(52) U.S. Cl. ............................................................ 43/21.2
(58) Field of Search ........................... 43/21.2; D22/147; 224/922; 248/511–540; 211/105.1, 70.8; 83/928; 40/209

(56) References Cited

U.S. PATENT DOCUMENTS 5,732,927 * 3/1998 Purpura ................................. 248/539
5,815,976 * 10/1998 Jernigan et al. ...................... 43/21.2

OTHER PUBLICATIONS

Angler's Aluminum Products P O Box 698 Wanchesg NC Internet Web Site showing prior pipe system devices. http://www.Fishtradewinds.com/aap/index.htm.

* cited by examiner

Primary Examiner—Peter M. Poon
Assistant Examiner—Floris C Copier

(57) ABSTRACT

An apparatus for convenient conveyance of fishing rods on a vehicle comprising a base plate with mounting slots for bolting or strapping the apparatus to the bumper of an automobile or truck, threaded holes for mounting the vehicle's license tag on the base plate; an area on the base plate for a trademark, an upper row of round apertures and a lower row of "D" apertures separated by a distance sufficient to prohibit movement, other than upward, of portable fishing rod holders to be inserted to receive fishing rods for transport.

6 Claims, 3 Drawing Sheets

APPARATUS FOR CONVENIENT CONVEYANCE OF FISHING RODS ON A VEHICLE

BACKGROUND OF THE INVENTION

This invention relates generally to the field of sporting goods, and more particularly to an apparatus for convenient conveyance of fishing rods on a vehicle.

Fishing rods, because of their long and fragile construction, have always been difficult for fishermen to conveniently transport without damage, particularly rods for ocean surf fishing, which are typically 11 feet or longer. As a result, devices were first developed for carrying these long rods horizontally on top of the vehicle in clamps. Later, devices were developed to be attached to the front or rear bumper for transporting fishing rods in a vertical position. The vertical position has come to be preferred because it allows quick access. The rods stand up vertically on the vehicle bumper at waist level, versus being clamped horizontally on top of the vehicle above one's head. In addition, the vertical position does not require supplemental clamping devices since the rods will stay in place due to gravity.

These prior vertical transport devices use systems of horizontal and vertical pipe welded together and mounted to the bumper of a vehicle. These prior pipe system devices have generally been constructed of aluminum, however PVC plastic pipe has also been used. The older horizontal clamping devices have declined significantly in use.

While the pipe system devices provide convenient access to one's fishing rods on a vehicle, they introduce many problems for the vehicle owner, especially owners of today's beautiful, expensive and luxurious sport utility vehicles (SUV's) which are used extensively for surf fishing. First, the pipe system devices are quite unattractive and overwhelming additions to an otherwise beautiful vehicle. Second, the pipe system devices are extremely heavy (50 pounds or more), unwieldy and extend the overall vehicle length by as much as one foot regardless of whether being used to carry rods or not. Third, the pipe system devices are very expensive due to the large amount of material employed and the cutting, fitting and welding operations required. Fourth, the pipe system devices, due to their massive weight and size, often necessitate extensive vehicle modification for mounting, resulting in physical damage to the vehicle. Fifth, the pipe system devices often hide the vehicle's license tag and otherwise interfere with access to the section of the vehicle behind it. Finally, the pipe system devices are not designed for carrying portable rod holders (known as "sand spikes") in conjunction with fishing rods.

BRIEF SUMMARY OF THE INVENTION

An apparatus for convenient conveyance of fishing rods on a vehicle is disclosed comprising: a base plate with mounting slots for bolting or strapping the apparatus on the bumper of an automobile or truck, threaded holes for mounting a standard automobile or truck license tag and an area for a trademark; an upper row of round apertures for receiving portable fishing rod holders into which the fishing rods are easily inserted for transport; and a lower row of "D" shaped apertures, to prevent movement of the portable rod holders other than upward after the portable rod holders are inserted in the apertures.

The primary object of the invention is to provide an improved apparatus for conveniently transporting fishing rods on a vehicle. Another object of the invention is to provide an apparatus that is unobtrusive and inconspicuous compared to current devices so as not to detract from the overall beauty of the vehicle. Another object of the invention is to provide an apparatus that is more compact and lighter in weight than currently available. A further object of the invention is to provide an apparatus that is significantly easier to manufacture and inexpensive compared to current devices. Yet another object of the invention is to provide an apparatus that minimizes drilling or other damage to the vehicle resulting from mounting the apparatus on the vehicle. Still yet another object of the invention is to provide an apparatus that also allows display of the vehicles license tag. And finally, an object of the invention is to provide an apparatus that also allows convenient transportation of portable fishing rod holders in conjunction with the fishing rods.

My invention accomplishes all the above objectives while, at the same time, overcoming the problems introduced by the prior pipe system devices. Whereas the prior pipe system devices are quite unattractive and overwhelming when mounted on today's beautiful SUV's, my invention blends into the existing lines of the vehicle and is, in fact, almost unnoticeable when not being used to carry fishing rods. In contrast to the heavy weight and bulkiness of the prior pipe system devices, my invention weighs about 3 pounds and does not add significantly to the vehicle length, even when being used to carry fishing rods. Whereas the prior pipe system devices often cost hundreds of dollars, my invention, due to it's simple design, can be very easily and inexpensively manufactured from a minimum of standard materials, with a preferred embodiment profitably sold for one-tenth the price of the prior devices. In contrast to the extensive modifications and damage caused to the vehicle in mounting the prior pipe system devices, my invention, due to it's compact design and light weight uses the vehicles existing license plate bracket mounting apertures resulting in no modifications or damage to the vehicle. In contrast to the prior pipe system devices that hide the vehicle's license tag and otherwise interfere with access to the section of the vehicle behind the device, my invention provides a place with mounting apertures for the vehicles license tag and is not much larger than the tag itself, allowing easy access to the vehicle behind it. And, finally, whereas the prior pipe system devices require the fisherman to carry portable rod holders (known as "sand spikes") elsewhere in the vehicle, my invention allows portable rod holders to be inserted in the apertures so as to be used to transport the fishing rods and then be removed for use as "sand spike" portable rod holders for fishing on the beach.

Other objects and advantages of the present invention will become apparent from the following descriptions, taken in connection with the accompanying drawings, wherein, by way of illustration and example, an embodiment of the present invention is disclosed.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE INVENTION

Detailed descriptions of two embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
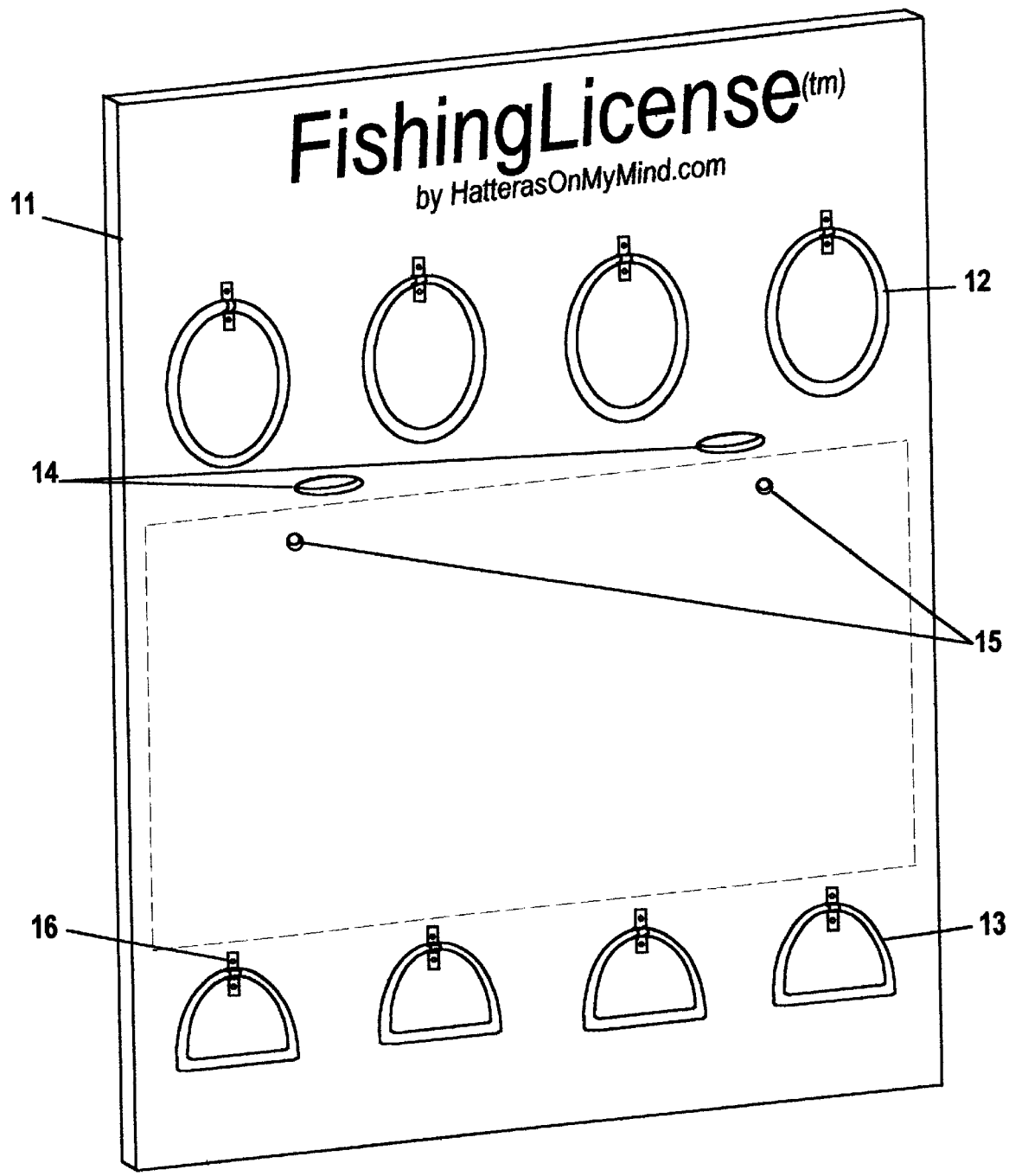
FIG. 1 is a perspective view of the invention when not being used to carry fishing rods, i.e. apertures(rings in this embodiment) in the flat position.

Turning now to the drawings, FIG. 1 shows clearly all the elements of one embodiment of my simple invention. A base plate (11) is shown in this perspective view with my invention's apertures formed by rings. An upper row of rings (12, typical) is fastened across the top, just below a trademark. A lower row of "D" rings (13, typical) is shown fastened across the bottom of the base plate. Mounting slots (14) are shown as elongated for flexible mounting on the bumper of an automobile or truck. Threaded icense tag mounting holes (15) are also shown in this figure. A standard automobile license tag, in dotted lines, is shown to illustrate the capability of the base plate to display a tag. Fasteners (16, typical) are shown that secure the rings to the base plate. This FIG. 1 shows an embodiment of my invention in its everyday (not fishing) mode with the rings folded down into the flat position. The rings can be fastened to the base plate using any commercially available fastening method such as spot welding or riveting. FIG. 1 shows a small strap of base plate material riveted to the base plate as a method to fasten each ring.

Figure 2:
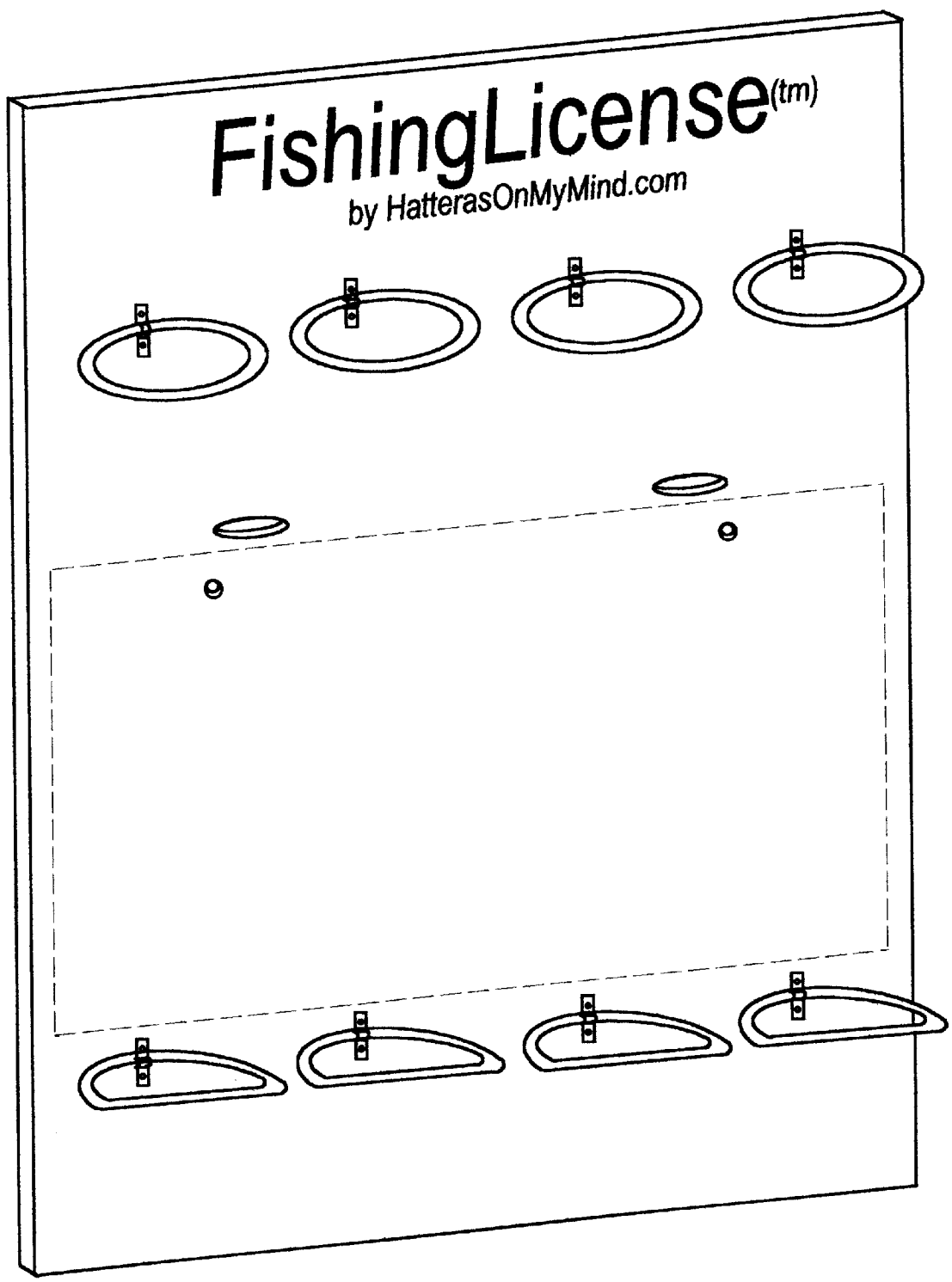
FIG. 2 is a perspective view of the invention when being used to carry fishing rods, ie, apertures (rings in this embodiment) in the perpendicular position.

In FIG. 2, the same embodiment of my invention shown in FIG. 1 is shown with the rings positioned perpendicular to the base plate in its working (or fishing) mode to carry portable rod holders with fishing rods. This embodiment includes capacity to transport 4 fishing rods, however my invention includes the capability for easy expansion of its capacity by simply making it wider.

Figure 3:
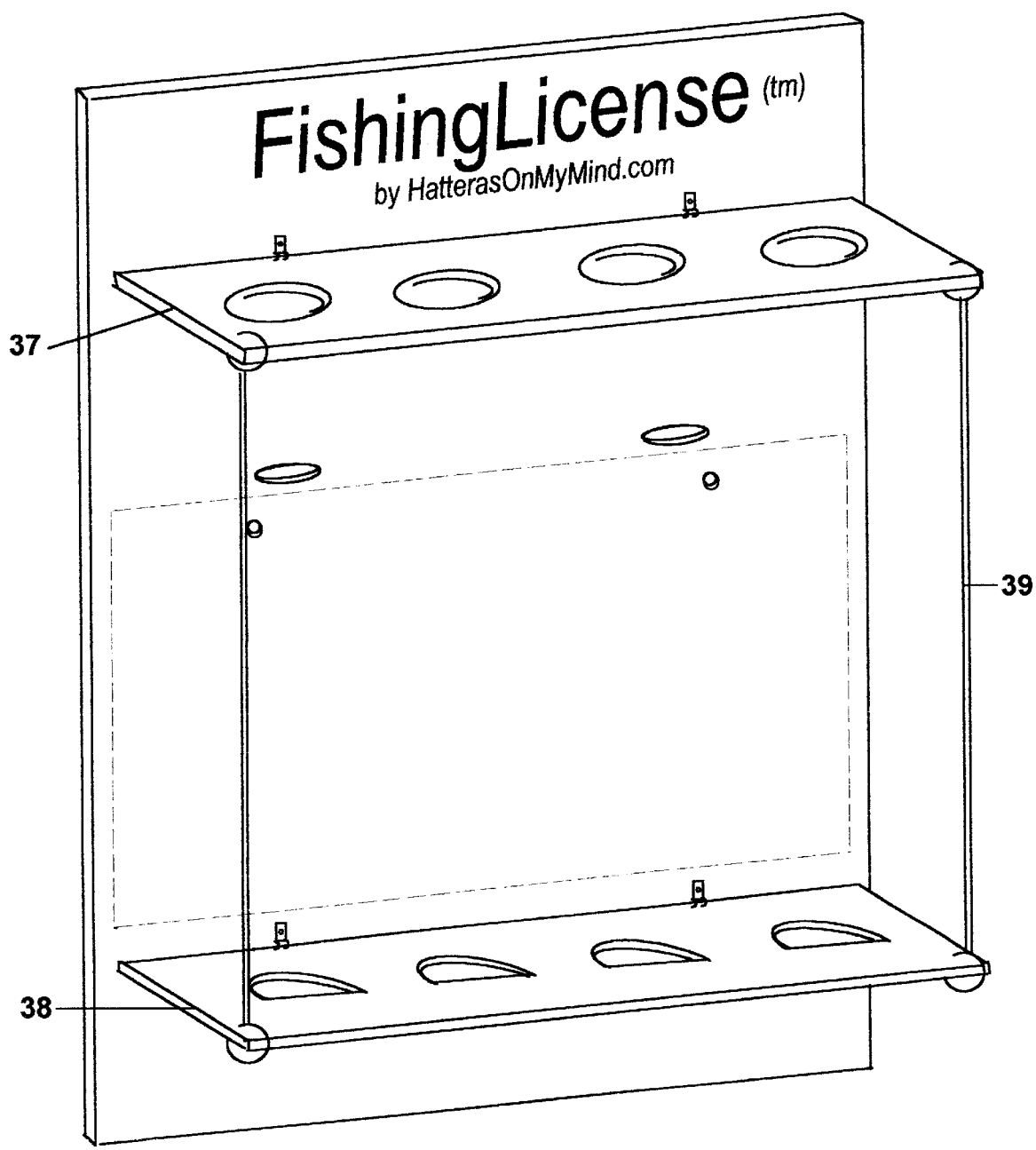
FIG. 3 is a perspective view of another embodiment of the invention using upper and lower secondary plates.

FIG. 3 shows another embodiment of my invention using upper (37) and lower (36) secondary plates, the with holes cut in them to form the apertures in my invention, fastened to a base plate. Linkage (39, typical) is shown between the two secondary plates such that when one secondary plate is moved the other secondary plate duplicates the movement.

These figures illustrate the overall simplicity of my invention compared to prior devices constructed from horizontal and vertical pipes welded together. My invention is far superior to prior devices in that it: is visually inconspicuous and unobtrusive when mounted on the vehicle; is compact and light weight; is significantly easier and less expensive to manufacture, store and display; requires no damage to the vehicle to install; provides a place to display a license tag; and provides a place to transport portable rod holders along with fishing rods.

While the invention has been described in connection with two possible embodiments it is not intended to limit the scope of the invention to the particular forms set forth, but on the contrary, it is intended to cover such alternatives, modifications, and equivalents as may be included within the spirit and scope of the invention as defined by the appended claims.

What is claimed is:

1. An apparatus for convenient conveyance of fishing rods on a vehicle comprising:

a) a base plate with mounting slots for bolting or strapping the apparatus to the bumper of an automobile or truck, threaded holes for mounting a standard automobile or truck license tag and an area for displaying a trademark;

b) a row of upper apertures perpendicular to the base plate each having the same round shape as the circumference of a hollow cylindrical portable fishing rod holder to be inserted for receiving fishing rods for conveyance and a diameter sufficiently larger than the outer diameter of the hollow cylindrical portable fishing rod holder, such that the hollow cylindrical portable fishing rod holder can be easily slid into and removed from any upper aperture while limiting any horizontal movement of the hollow cylindrical portable fishing rod holder; and c) a row of lower apertures perpendicular to the bass plate of a "D" shape, vertically aligned below the upper apertures, positioned a sufficient distance below the row of upper apertures, such that movement, other than upward movement, of a hollow cylindrical portable fishing rod holder inserted into a matching upper and a lower aperture is prohibited, said "D" shape being the same as the cross-section of a hollow cylindrical portable fishing rod holder taken perpendicular to the major axis of such hollow cylindrical portable fishing rod holder at a point approximately half-way down a 43 degree angle cut off end on the bottom of the hollow cylindrical portable fishing rod holder.

2. An apparatus for convenient conveyance of fishing rods on a vehicle as claimed in claim 1 wherein said rows of upper and lower apertures are attached to the base plate in a hinged manner so that the apertures can be positioned down flat on the base plate when not being used in the position perpendicular to the base plate.

3. An apparatus for convenient conveyance of fishing rods on a vehicle as claimed in claim 2 wherein said rows of upper and lower apertures are formed by individual rings.

4. An apparatus for convenient conveyance of fishing rods on a vehicle as claimed in claim 2 wherein said rows of upper and lower apertures are formed by holes punched or cut in upper and lower secondary plates.

5. An apparatus for convenient conveyance of fishing rods on a vehicle as claimed in claim 4 wherein said upper and lower secondary plates include linkage such that movement of one secondary plate results in identical movement of the other secondary plate.

6. An apparatus for convenient conveyance of fishing rods on a vehicle as claimed in claim 1 wherein said rows of upper and lower apertures consist of holes punched or cut in a row across the top and a row across the bottom of the base plate, with such top and bottom portions of the base plate containing said holes being bent perpendicular to the remainder of the base plate such that each upper hole is directly above and parallel to its matching lower hole.

* * * * *